United States Patent [19]

DeAre

[11] Patent Number: 5,076,922
[45] Date of Patent: Dec. 31, 1991

[54] WATER-FILTRATION APPARATUS
[75] Inventor: David W. DeAre, Glen Ellyn, Ill.
[73] Assignee: Wilton Industries, Inc., Woodridge, Ill.
[21] Appl. No.: 596,361
[22] Filed: Oct. 12, 1990
[51] Int. Cl.$^5$ .......................................... B01D 24/22
[52] U.S. Cl. .................................. 210/282; 210/474; 210/476; 210/502.1
[58] Field of Search ............... 210/282, 266, 472, 473, 210/474, 475, 476, 496, 502.1

[56]  References Cited
U.S. PATENT DOCUMENTS

| | | | |
|---|---|---|---|
| 1,157,776 | 10/1915 | Hagg | 210/474 |
| 2,684,624 | 7/1954 | Alvarez | 210/474 |
| 4,212,743 | 7/1980 | Van Meter et al. | 210/282 |
| 4,298,475 | 11/1981 | Gartner | 210/266 |
| 4,505,727 | 3/1985 | Cullen et al. | 210/282 |
| 4,693,834 | 9/1987 | Hossom | 210/474 |
| 4,749,481 | 6/1988 | Wheatley | 210/282 |
| 4,828,692 | 5/1989 | Periano | 210/472 |
| 4,882,052 | 11/1989 | Periano | 210/282 |
| 4,895,648 | 1/1990 | Hankammer | 210/472 |
| 4,969,996 | 11/1990 | Hankammer | 210/472 |

Primary Examiner—Stanley S. Silverman
Assistant Examiner—Cynthia L. Nessler
Attorney, Agent, or Firm—James P. Ryther

[57]  ABSTRACT

A filtration apparatus for reducing contaminants in water used for household purposes and the like. The apparatus includes a water container with a receiving reservoir mounted in the container. The reservoir houses a filter and a first passage is formed at the top end of the reservoir for connecting the reservoir with the filter. A second passage permits the flow of water from the first passage into contact with a barrier wall spaced away from the first passage. A first chamber defined between the first passage and the barrier wall is connected by means of a third passage to a second chamber located on the other side of the barrier wall. The filter also includes a bottom wall defining openings communicating with the second chamber. Filtering material is located within the first and second chambers so that water introduced into the receiving reservoir passes downwardly through the first passage, transversely through the second passage into the first chamber, upwardly through the first chamber, and then transversely through the third passage to the second chamber. The water then travels downwardly through the second chamber and outwardly through the bottom wall openings for entering into the water container.

14 Claims, 2 Drawing Sheets

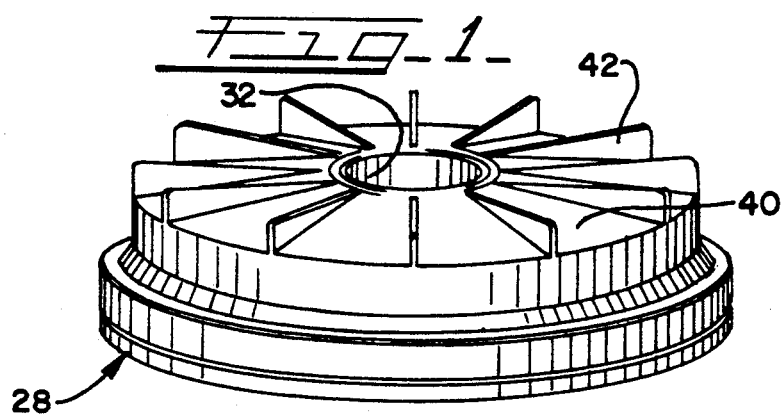
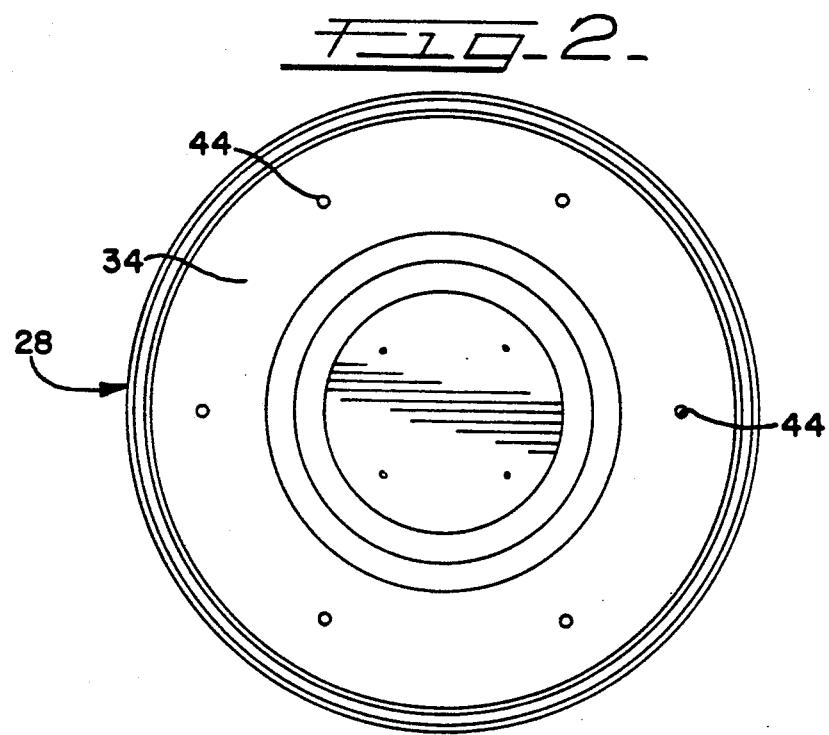
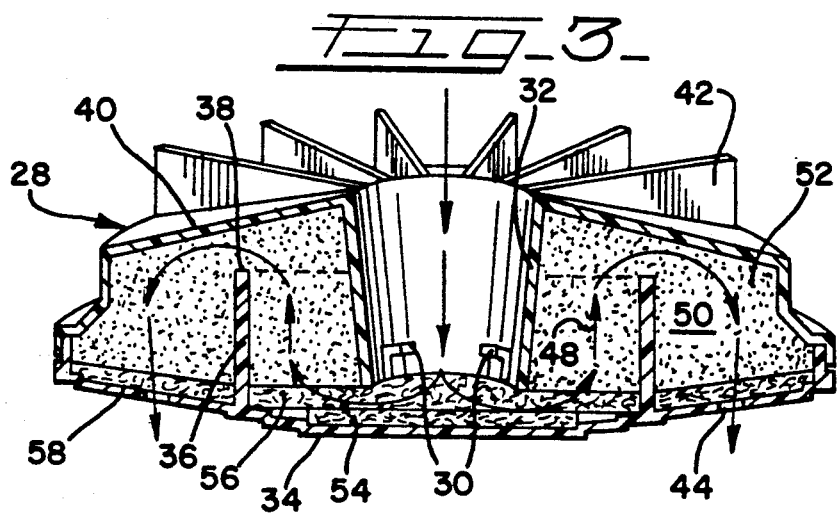

5,076,922

WATER-FILTRATION APPARATUS

BACKGROUND OF THE INVENTION

This invention relates to a water filtration apparatus which is designed specifically for reducing contaminants in water employed for household use or the like. Although many applications for the apparatus of this invention will be obvious, the apparatus is particularly suitable for providing improved drinking water both from the standpoint of health and safety and also from the standpoint of providing more taste-satisfying drinks.

Various attempts have been made to provide means for achieving removal of contaminants from water. The most pertinent of such means include the provision of filter cartridges or the like which are associated with pitchers or similar water containers. The user will pour the tap water into a reservoir or other funnel-type structure, and the cartridge is arranged so that the water must pass through the cartridge before entering the pitcher.

Filtering material which may comprise a combination of a resin and activated carbon is located within the cartridge so that the water will contact the filtering material before entering the pitcher. The resin and carbon media serves to attract various elements typically found in tap water such as lead and chlorine whereby the water is cleansed before entering the pitcher.

Examples of prior art structures of the general type discussed include U.S. Pat. No. 8,374 which issued in 1834 as well as subsequently issued U.S. Pat. Nos. 417,070; 967,905; 2,335,458; 2,376,410 and 4,693,874.

U.S. Pat. No. 417,070 is of interest in view of the inclusion of interior barrier walls which direct the flow of water within a combination reservoir and filter structure. With this arrangement, the water flowing through the filter is directed along a sinuous path for purposes of achieving extended contact between the water and filtering material while somewhat limiting the size of the filter itself.

SUMMARY OF THE INVENTION

This invention comprises a water contaminant-reducing filtration apparatus for household use and the like. The invention comprises a combination of a water container such as a water pitcher along with a water receiving reservoir mounted in the container. A filter is associated with this reservoir so that water poured into the reservoir will pass through the filter before entering the water container.

The filter is designed to be removably attached to the reservoir. Preferably, the filter is attached to a stem or funnel-shaped member extending downwardly from the reservoir with this stem defining a first passage for water moving through the reservoir. Means in the form of a bayonet-type connection or the like are utilized for attaching the filter at the end of this stem.

A second passage is formed at the end of the first passage, and this second passage is defined between the end of the stem and the bottom wall of the filter. This second passage extends into a first chamber defined by the filter with a barrier wall extending upwardly from the bottom wall for defining one extreme of the first chamber.

A second chamber is defined by the filter on the opposite side of the barrier wall and a third passage is defined between the upper end of the barrier wall and the top wall of the filter. This third passage communicates the first and second chambers. Openings defined in the bottom wall of the filter permit flow of water outwardly from the filter and into the pitcher or other water container.

Each of the chambers contain filtering material which may be of the conventional resin and activated carbon mix. In the operation of this apparatus, water introduced into the reservoir flows downwardly through the first passage and then transversely through the second passage for entry into the first chamber. By reason of the presence of the barrier wall, the water flows upwardly through the first chamber, transversely through the third passage, and then downwardly through the second chamber before it exits from the openings defined by the filter bottom wall. By reason of the location of the filtering material in the first and second chambers, a cleaner, fresher water is delivered into the water pitcher.

BRIEF DESCRIPTION OF THE DRAWINGS

FIG. 1 is a perspective view of a filter employed in the apparatus of this invention;

FIG. 2 is a bottom plan view of the filter;

FIG. 3 is a vertical cross-sectional view of the filter;

DETAILED DESCRIPTION OF THE PREFERRED EMBODIMENT

Figure 4:
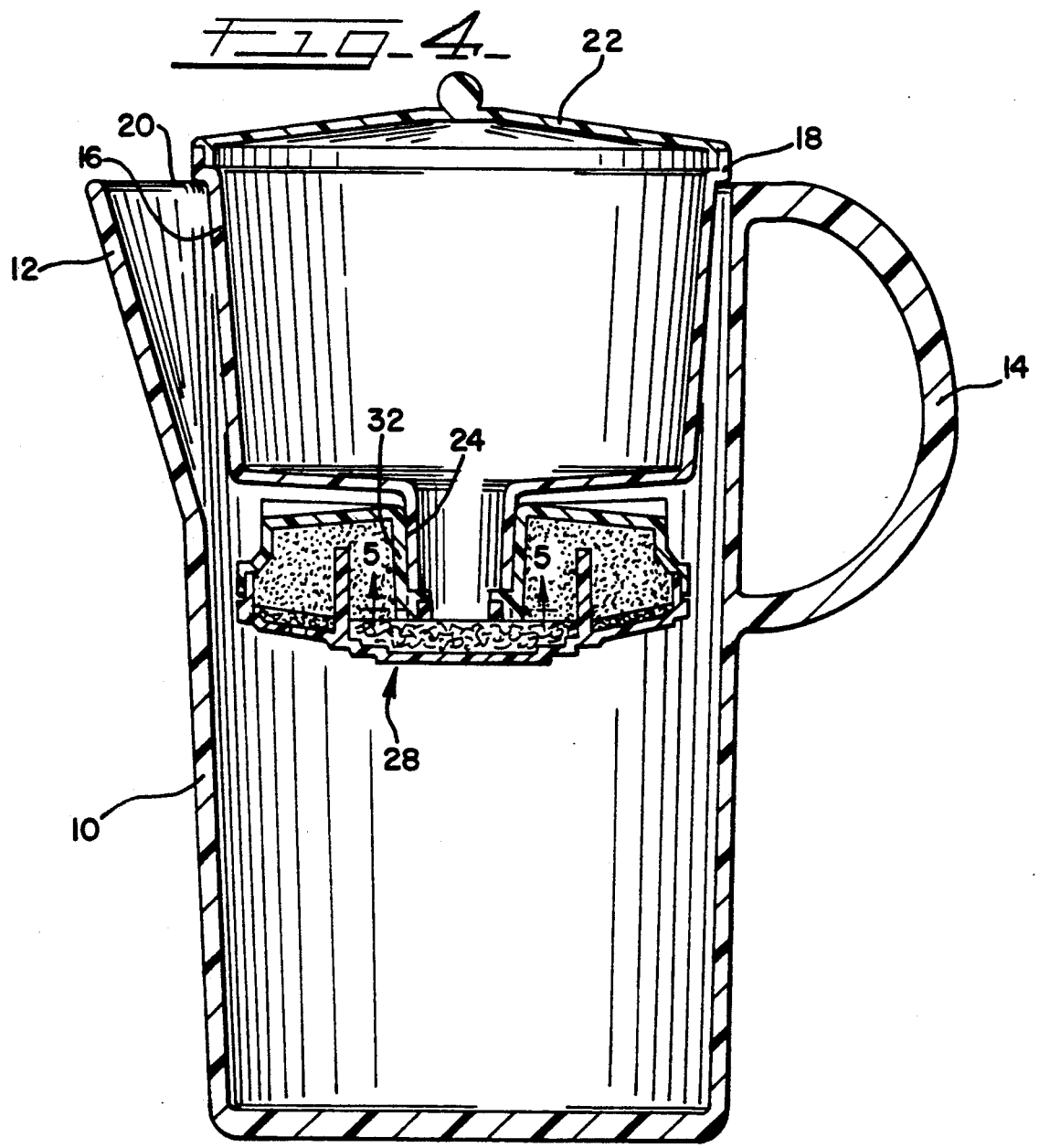
FIG. 4 is a vertical cross-sectional view of the apparatus of the invention comprising a water pitcher and reservoir with an attached filter; and, FIG. 5 is an enlarged horizontal cross-sectional view taken about the line 5—5 of FIG. 4.

The drawings illustrate the combination of the invention which includes a water container 10 comprising a water pitcher with a spout 12 and handle 14. A consideration of the description of the invention will make it clear that water containers of various other types are suitable for use in conjunction with the other elements of the combination.

A water reservoir 16 defines a shoulder 18 which allows for resting of the reservoir on the upper edge 20 of the pitcher 10. A cover 22 may be employed in association with this reservoir. It should be understood that the configuration of the reservoir 16 is dependent upon the configuration of the pitcher or other water container, and that various shapes may be assumed by this reservoir.

Figure 5:
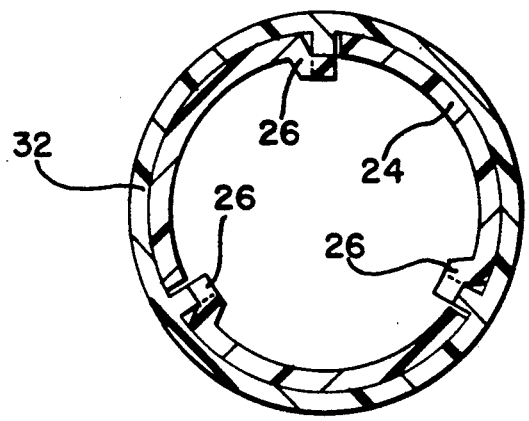

The reservoir defines a downwardly extending stem or funnel member 24. As more particularly illustrated in FIG. 5, a plurality of bayonet-type connecting means 26 are formed at the end of this stem. These connecting means serve as a means for attaching the filter 28 which is illustrated in detail in FIGS. 1 through 3.

The filter 28 includes finger-like elements 30 formed for engagement with the connecting means 26 of the stem 24. It will be noted in particular that the filter 28 defines a cylindrical section 32 which is adapted to be fit around the stem 24 with the elements 30 located at a level above the connecting means 26. Upon rotation of the filter, the elements 30 are adapted to engage the top of the connecting means 26 to secure the filter in place.

The filter includes a bottom wall 34 which is spaced away from the bottom edge of the cylindrical section 32. Spaced laterally from this cylindrical section is a barrier wall 36 extending upwardly from the bottom wall 34. The top edge 38 of this barrier wall terminates short of the top wall 40 of the filter. A plurality of radiating fins 42 are shown in association with the top wall; however, these fins are intended for decorative purposes and may be eliminated.

A plurality of openings 44 are defined by the bottom wall of the filter. When considering the over-all structure, it will be noted that water introduced into the reservoir 16 will pass through the stem 24. Since the bottom edge of the stem terminates in spaced relationship with the bottom wall 34 at about the same point as the bottom edge of the cylindrical section 32, an annular first passage is defined for movement of the water laterally toward the barrier wall 36.

The water then moves upwardly over the top edge of the barrier wall 36. It will be appreciated that a second annular passage is formed between this top edge of the top wall 40 of the filter whereby this upward movement is followed by transverse movement to the other side of the barrier wall. The water then progresses downwardly and out through the openings 44 for entry into the pitcher 10.

The barrier wall 36 serves to form an inner annular chamber 48 and an outer annular chamber 50. These chambers are filled with a filtering material 52 which may comprise, for example, a conventional mix of resin and activated carbon. Filter pads may be included such as a first filter pad 54 positioned at the outlet of the reservoir stem, an before entry into the first chamber 48 and before the water overlying pad 56, and a donut shaped pad 58. These pads thereby provide means for independently filtering water exits from the openings 44. In a typical application, the mix of resin and activated carbon particles will be in a ratio of 2 parts to 1 part. Filter pad material manufactured by Fabricated Filters, Inc., specification number PE 66200, may also be utilized.

It will be appreciated that there has been described a combination ideally suited for use in the removal or at least reduction of contaminants such as lead and chlorine from tap water. The invention may achieve advantages such as better appearance for the water, better taste for the water itself and for drinks made from the water, and a safer drinking water.

Additional significant advantages include the fact that the filter 28 is very conveniently replaced. Thus, the reservoir and pitcher are reusable while the filter itself is intended for replacement periodically, for example, after about one month of use.

The design of the housing for the filter also renders it quite compact while still achieving a lengthy path for contact of the water with the filter material. Thus, the transverse, upward, transverse and then downward path insures sufficient filtering action even though the diameter of the filter may be in the order of between about 4½ and 5½ inches and the height may be in the order of between about ¾ and 1¼ inches.

It will be understood that various changes and modifications may be made in the above-referenced apparatus which provide the advantages of the invention without departing from the spirit thereof, particularly as defined in the following claims.

I claim:

1. A water contaminant reducing filtration apparatus for household and like use comprising a water container, a receiving reservoir mounted in said container, a filter associated with said reservoir, means forming a first passage having a top end, said first passage connecting said reservoir and said filter, a bottom wall for said filter, said means forming said passage having a bottom end terminating short of said bottom wall whereby a second passage is defined between said bottom end and said bottom wall, a barrier wall spaced from said first passage, a first chamber defined between said first passage and said barrier wall, said second passage connecting said first passage and said first chamber, a top wall defined by said filter, said barrier wall extending upwardly from said bottom wall, a top edge defined by said barrier wall and terminating short of said top wall, a third passage defined between said top edge and said top wall, a second chamber located on the side of said barrier wall opposite said first chamber whereby said third passage connects said first and second chambers, openings defined in said bottom wall for communicating said second chamber with said water container, and filtering material located in said first and second chambers, wherein water is introduced to said receiving reservoir passing downwardly through said first passage, transversely through said second passage into said first chamber, upwardly through said first chamber, transversely through said third passage, downwardly through said second chamber, and outwardly through said openings for entry into said water container.

2. An apparatus according to claim 1 wherein said first passage comprises a central passage, said first chamber comprising an inner chamber surrounding said first passage, said second chamber comprising an outer chamber surrounding said first chamber and a side wall for said filter, said second chamber being defined between said side wall and said barrier.

3. An apparatus according to claim 1 wherein said filter is removably connected to said reservoir.

4. An apparatus according to claim 3 including bayonet-type connecting means for said filter.

5. An apparatus according to claim 2 wherein said reservoir defines a downwardly-extending stem member, said stem member forming said central passage, said filter defining a central section interfitting around said stem member.

6. An apparatus according to claim 5 wherein said central section has a bayonet-type connection with said stem member.

7. An apparatus according to claim 1 wherein said bottom wall is removably attached for facilitating location of the filtering material within said filter.

8. An apparatus according to claim 1 wherein the transverse dimensions of said filter substantially exceed the vertical dimensions whereby a compact structure is provided.

9. An apparatus according to claim 7 wherein said filter has a diameter between about 4½ and 5½ inches and a height between about ¾ and 1¼ inches.

10. An apparatus according to claim 7 wherein the bottom wall of the filter is substantially flat to thereby facilitate handling.

11. An apparatus according to claim 2 wherein said filtering material comprises a mixture of resin beads and activated carbon.

12. An apparatus according to claim 11 including a fiber filter located at the end of said central passage, said mixture being located within said inner and outer chambers.

13. An apparatus according to claim 12 including an additional fiber filter positioned between said mixture and said openings 14. An apparatus according to claim 1 wherein said water container comprises a water pitcher defining an upper edge, said receiving reservoir including shoulder means resting on said upper edge for removably holding the reservoir in position on the pitcher.

* * * * *